United States Patent
Anastasio et al.

(10) Patent No.: US 8,505,697 B2
(45) Date of Patent: Aug. 13, 2013

(54) BRAKE SYSTEM FOR AIRCRAFT UNDERCARRIAGE

(75) Inventors: Vincenzo Anastasio, Pomigliano D'Arco (IT); Fabrizio Cuomo, Pomigliano D'Arco (IT)

(73) Assignee: Alenia Aeronautica S.p.A., Pomigliano D'Arco (IT)

( * ) Notice: Subject to any disclaimer, the term of this patent is extended or adjusted under 35 U.S.C. 154(b) by 230 days.

(21) Appl. No.: 13/028,331

(22) Filed: Feb. 16, 2011

(65) Prior Publication Data
US 2011/0253833 A1    Oct. 20, 2011

(30) Foreign Application Priority Data
Feb. 16, 2010    (IT) .............................. TO2010A0116

(51) Int. Cl.
*B60L 7/14*    (2006.01)
*F16D 55/36*    (2006.01)

(52) U.S. Cl.
USPC ........................... 188/164; 188/71.5; 303/151

(58) Field of Classification Search
USPC ................ 188/71.5, 161, 164; 303/151, 152; 180/65.1, 65.21, 65.31
See application file for complete search history.

(56) References Cited

U.S. PATENT DOCUMENTS

| | | | |
|---|---|---|---|
| 4,864,173 A * | 9/1989 | Even | 188/161 |
| 8,294,394 B2 * | 10/2012 | Anastasio | 318/380 |
| 2003/0116367 A1 * | 6/2003 | Kanno | 180/65.1 |
| 2005/0224642 A1 | 10/2005 | Sullivan | |
| 2006/0108867 A1 * | 5/2006 | Ralea | 303/152 |
| 2007/0247001 A1 * | 10/2007 | Nakano | 303/157 |
| 2007/0284939 A1 * | 12/2007 | Charles et al. | 303/152 |
| 2008/0179146 A1 * | 7/2008 | Sullivan | 188/164 |
| 2008/0258014 A1 | 10/2008 | McCoskey | |

FOREIGN PATENT DOCUMENTS

| | | |
|---|---|---|
| EP | 1 867 567 A1 | 12/2007 |
| FR | 2 389 500 A1 | 12/1978 |

* cited by examiner

*Primary Examiner* — Thomas J Williams
(74) *Attorney, Agent, or Firm* — Berenato & White, LLC

(57) ABSTRACT

A braking system for an aircraft provided with undercarriage, wherein an axial-flux reversible electrical machine is associated to at least one wheel of the undercarriage and is set in rotation by the rotation of the wheel. Current-dissipator is provided, which can be connected to the windings of the axial-flux reversible electrical machine during rotation of the wheel in the landing phase for dissipating in the current-dissipator the induced currents generated by the machine, which behaves as current generator, and producing a braking effect that slows down the movement of the wheel. An epicyclic reducer is provided between the wheel of the undercarriage and the rotor of the reversible electrical machine. The epicyclic reducer provides a transmission ratio T in such a way that the rotor will turn at a velocity $T\omega$ with respect to the velocity of rotation $\omega$ of the wheel.

9 Claims, 3 Drawing Sheets

US 8,505,697 B2

BRAKE SYSTEM FOR AIRCRAFT UNDERCARRIAGE

The present invention relates to a braking system for aircraft undercarriage.

BACKGROUND OF THE INVENTION

As is known, during the operations of landing of aircraft, the latter have to be braked in order to reduce their speed and terminate the trip safely within the landing strip. Braking of the aircraft occurs by the action of brakes of an aerodynamic type and by the action of mechanical brakes coupled to the wheels of the undercarriage of the aircraft.

Currently, undercarriages of aircraft are provided with mechanical disk brakes, which are operated by oil under pressure coming from a hydraulic circuit. In particular, the braking action is modulated manually by the pilot by action on a brake pedal that acts on valves of the hydraulic circuit.

As is known, disk brakes are subject to a rapid wear on account of the high value of kinetic energy that is to be dissipated during braking of the aircraft.

Disk brakes moreover reach very high temperatures, which can jeopardize the efficiency thereof and drastically reduce their service life.

There have moreover been proposed braking systems of an electrical type, which use reversible electrical machines, directly coupled to the undercarriage, which are designed to provide a braking action of a "totally electrical" type.

For example, the patent application No. PCT WO 2005/102839 describes an axial-flux machine directly coupled to the wheels of an undercarriage of an aircraft in order to provide a plurality of functions, amongst which:
  prior to the landing phase the electric motor is supplied so as to set the wheels of the undercarriage in rotation and favour landing, moreover reducing the wear of the tyres due to the effect of friction on the landing strip;
  following upon contact of the wheels of the undercarriage with the landing strip, the reversible electrical machine behaves as a generator, producing energy and thus exerting a braking action—the electrical energy is dissipated in resistors or is supplied to sections of the motor that provide a braking action opposite to the direction of rotation of the generator;
  part of the energy is stored in an on-board system for being re-used subsequently; and
  following upon completion of the operations of landing of the aircraft, the reversible electrical machine can be supplied and used on the runway for moving the aircraft in opposite directions.

The applicant of the patent application has found how, notwithstanding the fact that the solution disclosed in the patent application No. PCT WO 2005/102839 referred to above can be acknowledged absolute theoretical validity, it cannot be implemented on any commercial aircraft in operation. In fact, from an analysis of the dimensions of the rims of the wheels for aircraft undercarriage and of the values of the torques necessary to obtain safe braking (i.e., in the times and in the ways required by current certification standards), it emerges that at present the rims of the undercarriage wheels do not enable in any way integral housing inside them of machines capable of generating adequate braking torques in so far as the radial dimensions are limited by the internal diameter of the rim of the wheels of the undercarriage within which the reversible electrical machine is to be integrally housed.

SUMMARY OF THE INVENTION

The aim of the present invention is instead to provide a braking system for the wheels of an undercarriage of an aircraft that will solve the problems referred to above typical of known "totally electrical" braking systems. In particular, in order also to limit the weight and overall dimensions of the machine, it is envisaged that the coupling between the wheel of the undercarriage and the axial-flux machine cannot be of the direct type but must necessarily envisage the use of a reducer, for example an epicyclic reducer, thus enabling the machine to generate the torque necessary for braking.

The above aim is achieved by the present invention in so far as it regards a braking system for an aircraft provided with undercarriage in which an axial-flux reversible electrical machine is associated to at least one wheel of the main undercarriage and is set in rotation by the rotation of the wheel. Since current-dissipator means are provided, which can be connected to the windings of said axial-flux reversible electrical machine, during rotation of said wheel in the landing phase induced currents are produced in the dissipator means that are generated by the machine, which behaves as electric generator, thus producing a braking effect that slows down the movement of said wheel. Said braking system is characterized in that it comprises an epicyclic reducer set between the wheel of the undercarriage and the rotor of said reversible electrical machine, said epicyclic reducer providing a transmission ratio T in such a way that the rotor will turn at a velocity $T\omega$ with respect to the velocity of rotation $\omega$ of the wheel.

BRIEF DESCRIPTION OF THE DRAWINGS

The invention will now be illustrated with particular reference to the attached drawings, which represent a preferred non-limiting example of embodiment thereof and in which.

DETAILED DESCRIPTION OF THE INVENTION

Figure 1:
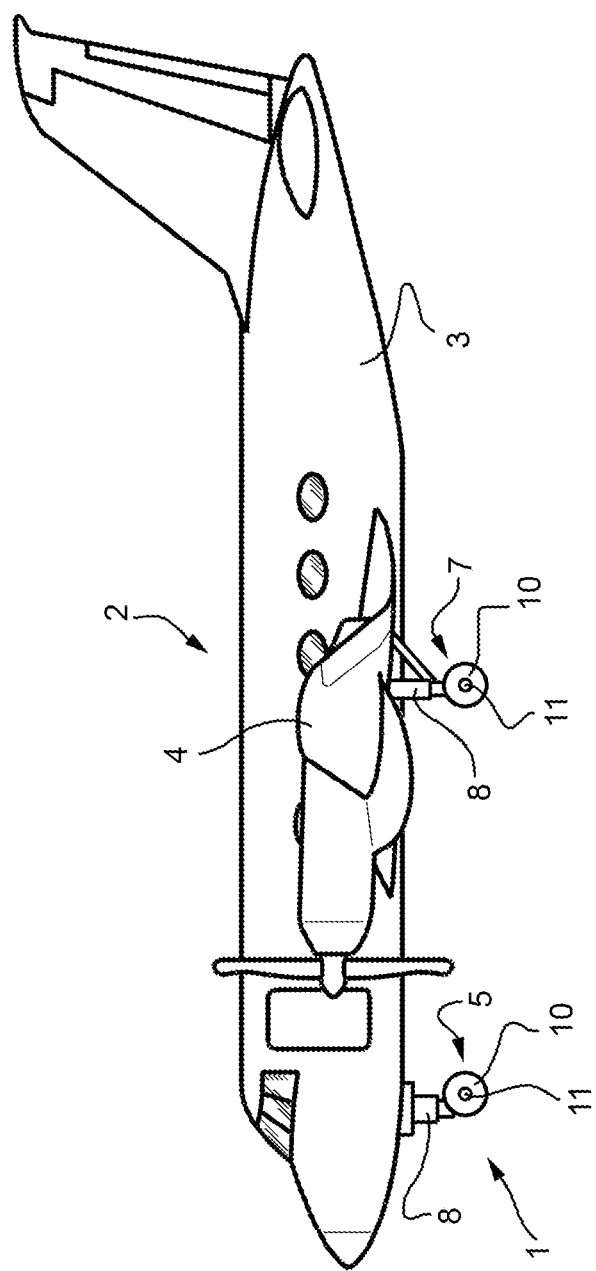
FIG. 1 is a schematic illustration of an aircraft using the system of the present invention.

Designated as a whole by 1 in FIG. 1 is a braking system for an aircraft 2 (for example, an aircraft for regional transport—represented schematically) comprising a fuselage 3, two side wings 4, a front undercarriage 5 carried by the fuselage 3 and two lateral undercarriages 7, each carried in the example of embodiment, by a corresponding wing 4.

Each of the undercarriages 5, 7 comprises a respective frame 8, a top terminal portion of which is coupled to a corresponding load-bearing structure (not illustrated) of the aircraft 2, and an opposite bottom terminal portion of which carries hinged, in the particular example described, one or more pairs of wheels 10 hinged to the frame 8 so as to turn about a corresponding hinge axis 11.

Figure 3:
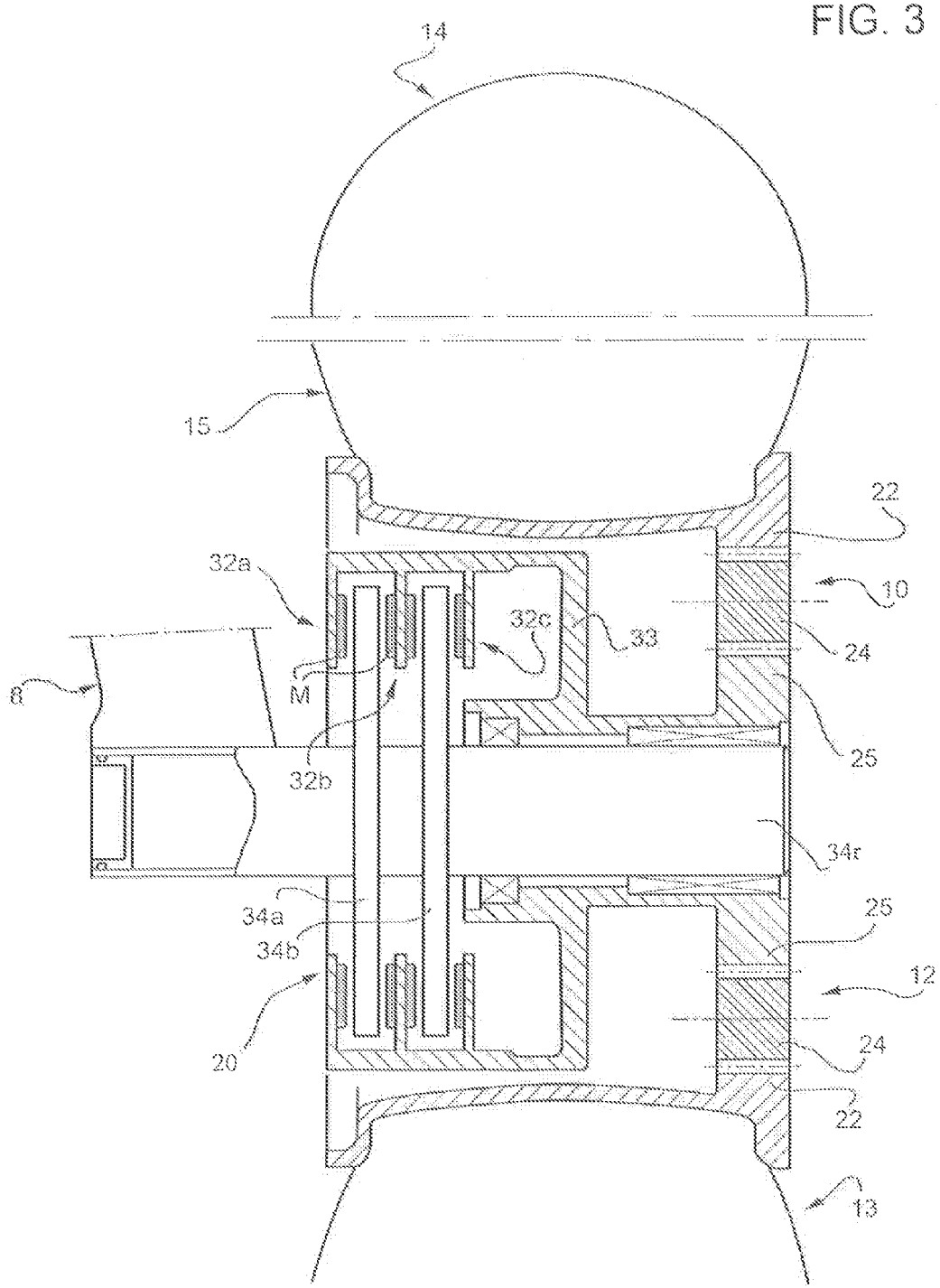
FIG. 3 illustrates, at an enlarged scale, a mechanical particular of an undercarriage.

Each wheel 10 (FIG. 3) comprises a metal rim 12, which carries at least one tyre 13, in turn comprising a tread 14 and two side walls 15.

In the particular example described, the undercarriages 5 and 7 are of a retractable type and for this reason are associated to respective movement assemblies, in themselves known and not described in detail, each designed to displace the corresponding undercarriage 5, 7 between a retracted resting position (not illustrated), in which the undercarriages 5, 7 are completely housed in a seat of the fuselage 3 and, respectively, of the wings 4, and an operative extracted position (illustrated in FIG. 1), in which the undercarriages 5, 7 extend downwards from the fuselage 3 and from the wings 4.

Figure 2:
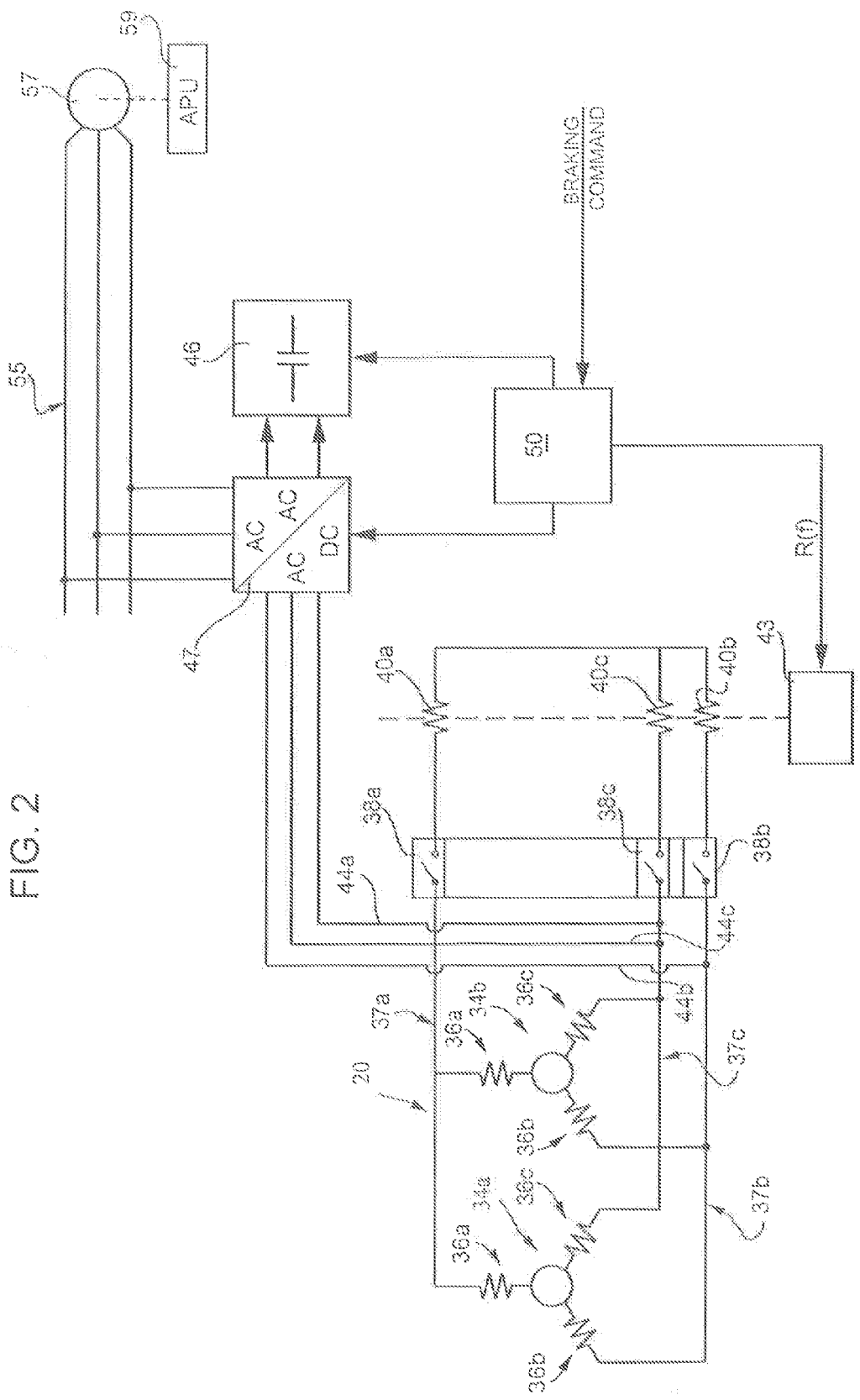
FIG. 2 is a simplified electrical diagram of the system according to the present invention.

An axial-flux reversible electrical machine 20 of a known type (FIG. 2) is coupled to the wheel 10 of an undercarriage 5, 7 in such a way that the rotor of the electrical machine 20 is set in rotation following upon the angular movement of the wheel 10 of the undercarriage 5, 7 with the stator of the machine 20 fixed with respect to the frame 8.

According to the invention, an epicyclic reducer 21 is set between the wheel 10 of the undercarriage and the rotor of the reversible electrical machine 20; the epicyclic reducer 21 provides a transmission ratio T in such a way that the rotor turns at a velocity $T\omega$ with respect to the velocity of rotation $\omega$ of the wheel 10 (with $T\omega>\omega$).

In greater detail, the epicyclic reducer 21 comprises:
- a ring gear 22 fixed with respect to an end portion of the rim 12 of the wheel 10;
- planetary gears or satellites 24 (three in the example), which mesh on the ring gear 22 and are carried by a planetary-bearing disk (not illustrated for reasons of simplicity and fixed with respect to the frame 8); and
- a sun gear 25, which meshes with the planetary gears or satellites 24 and is angularly fixed with respect to the rotor of the reversible electrical machine 20.

In the example of embodiment illustrated, the axial-flux reversible electrical machine 20 comprises a first rotor 32a, a second rotor 32b, and a third rotor 32c carried by a tubular body 33 fixed with respect to the sun gear 25 and mounted by interposition of bearings (not illustrated) on a wheel-bearing shaft 34r of the frame 8.

Each of the rotors 32a, 32b and 32c (of a known type) is formed by a plane metal wall shaped like an annulus provided with a plurality of permanent magnets M angularly spaced apart along a circular path. Typically, the permanent magnets M, of a plane type, have a trapezoidal shape in plan view.

The axial-flux electrical machine 20 comprises two stators 34a, 34b angularly fixed with respect to the shaft 34r. Each stator 34 is set between two rotors 32 set facing opposite faces of the stator 34.

Each of the stators 34a and 34b (of a known type) comprises a toroidal core made of ferromagnetic material (not illustrated) provided in which is a plurality of slots that house insulated electrical conductors wound around the toroidal core to provide a first winding 36a, a second winding 36b, and a third winding 36c, which have first terminals connected to one another and second terminals connected to a first electric line 37a, a second electric line 37b, and a third electric line 37c (FIG. 2), respectively.

Each electric line 37a, 37b, 37c communicates with respective first terminals of a single three-phase switch (for example, a static switch), designed to close/open three contacts 38a, 38b, 38c; the three-phase switch has second terminals connected, respectively, to a first terminal of a variable resistor 40a, 40b, 40c having a second common connection terminal.

The value of resistance R(f) provided by the variable resistor 40a, 40b, 40c is modifiable on the basis of a command signal set from a control block 43 under manual action of the pilot, who can act on a brake pedal (not illustrated).

In this way, by closing each contact 38a, 38b, 38c closing of the first, second, and third windings 36a, 36b, 36c on a respective variable resistor 40a, 40b, 40c is obtained.

Each first terminal of the static three-phase switch is connected to one end of an electric line 44a, 44b, 44c, which communicates with a device 46 (of a known type), in which electrical charge can be accumulated through an AC-DC converter 47.

Switching of the three-phase switch and operation of the converter 47 and of the device 46 is controlled by an electronic unit 50 that carries out braking of the aircraft 2 with modalities that will be clarified hereinafter.

Also present on the aircraft 2 is a three-phase electrical network 55 supplied by a current generator 57 operated by one of the engines and/or by an auxiliary turbine 59 (APU). The same generator 57 is also coupled with an AC-AC converter 47, which interfaces with the on-board three-phase electrical network 55.

The electronic unit 50 controls, with the modalities that will be clarified hereinafter, communication of the three-phase electrical network 55 with the electrical lines 37a, 37b, 37c through the section of AC-AC conversion of electrical power according to techniques of a known type that will not be described in further detail.

The electronic unit 50 moreover communicates with the block 43 for implementation of the manual braking command by means of a pedal.

In use, during landing of the aircraft 2, following upon contact between the undercarriages 5, 7 and the runway, the wheels 10 are set in rapid rotation. The presence of an epicyclic converter with transmission ratio T means that the rotors 32a, 32b, 32c move at a velocity $T\omega$ higher than the velocity of rotation $\omega$ of the wheel.

In this way, the rotors turn at a high velocity and consequently high electromotive forces are induced on the windings 36a, 36b, 36c in so far as the axial-flux reversible electrical machine 20 behaves as a current generator.

The electronic unit 50 then governs closing of the contacts 38a, 38b, 38c in such a way that the induced currents generated by the current generator 20 close on the resistors 40a, 40b, 40c, where the electrical energy is converted into heat by the Joule effect.

The induced currents have a direction that opposes the cause that has generated them, i.e., the movement of the rotors 32a, 32b, 32c within the magnetic field of the stator 34.

Consequently, a braking effect is produced, which slows down the movement of the rotor 32 and hence of the wheel 10 given the same braking power.

The braking effect is all the more intense the higher the velocity of the rotor 32 with respect to the stator 34; the presence of an epicyclic converter ensures reaching of a velocity of the rotor 32 that guarantees a high braking effect.

For this principle of operation, the braking action is maximum at the moment of contact of the aircraft 2 with the landing strip and decreases with the reduction of the speed of the aircraft 2.

Furthermore, by means of the control block 43 the pilot can modify the value of resistance R(f) and hence the value of the current that is dissipated by the resistors and modulates the braking force as a function of the velocity of the wheel 10. In other words, the degree of the braking action is given by the value of torque that is imposed by the armature current of the machine (induced on the windings of the stator elements 36a, 36b, 36c) and is determined by the value of the three-phase resistance R(f) due to the action of the pilot on the brake pedal.

In this way, unlike the majority of mechanical brakes that function by exploiting forces of friction, the principle of operation of the braking system of the present invention does not envisage parts subject to wear.

For each pair of wheels 10 the system in question subsequently enables actuation of an intrinsic anti-skid control (ASK) (of the ABS type) capable of modulating the braking action following upon a non-uniform deceleration of the wheels 10. In particular, in the case of blocking of a wheel 10 due, for example, to skidding phenomena, the system automatically blocks its braking action in so far as it no longer receives energy for developing the opposing resisting torque.

The amount of electrical power not used for braking is transferred, through the electrical lines 44a, 44b, 44c and the converter AC/DC 47, into the device 46 where the electrical charges accumulate in an accumulation system of a supercapacitive type.

When the velocity of rotation of the wheel 10 drops below a first threshold value such that the amount of the induced electromotive force, notwithstanding the presence of the epicyclic converter 21, would in turn determine an insufficient braking, the electronic unit 50 governs a gradual reduction of the value of resistance (up to short-circuiting) so as to keep the currents in the stator windings high. When the velocity of the wheel drops below a value such that the braking action by induction becomes negligible, the electronic unit 50 governs transfer of charge from the device 46, which releases the accumulated charge.

When the velocity of rotation of the wheel 10 drops below a second threshold value lower than the first, the on-board electrical network 55 intervenes. In particular, the electronic unit 50 is able to detect the angular velocity of the wheel 10 (i.e., of the rotors 32a, 32b, 32c) and simultaneously its instantaneous derivative (amount of deceleration) by governing, through the converter 47, the on-board electrical network 55 to impose upon the machine an appropriate armature current such as to maintain the opposing braking torque required by the pilot through the action on the brake pedal.

In this case, by using the on-board electrical network 55, the electrical machine 20 supplies further braking power.

Consequently, in this way, the definitive arrest of the aircraft 2 can be obtained in a "totally electrical" way, without using any brake of a mechanical type to enable definitive arrest of the means.

The aircraft 2 can be provided with a parking brake with mechanical blocking (by means of a pawl-and-ratchet mechanism of a known type, not illustrated) activated and de-activated electrically.

The electronic unit 50 can also be configured in such a way that the on-board electrical network 55 will supply through the converter 47 the electrical machine 20 with a current having a direction such as to obtain rotation of the reversible electrical machine and displacement of the aircraft 2 on the runway.

The reversibility of the machine 20 determines in fact the possibility of using the system 1 described also for the operations of taxiing and towing of the aircraft 2 on the runway. In this case, the power for supply of the system, necessary to obtain the static torque useful for movement of the aircraft, is detected directly by the on-board electrical network 55 without the need to turn on the main engines but by exploiting, for example, the generator 59 (APU) (already in itself operative during the step of loading on the ground).

During the taxiing step, there is subsequently envisaged a further control of a differential type capable of processing the information received from the front steering wheels (angle and direction of rotation) so as to change the velocity of rotation of each pair of wheels following upon non-rectilinear paths.

In the braking system described above, where the reversible electrical machines are of a three-phase type, there exists a direct proportionality between the opposing braking torque and the radius r of the wheel 10 (arm of the torque) that is of a cubic type, i.e., $C=f(r^3)$.

However, since the radius of the wheel 10 is a fixed quantity and the quantities involved are of a sufficiently high value, an increase of the braking torque can be obtained using an electrical machine of a "six-phase" type (not illustrated).

On this hypothesis, the increase of the number of phases (corresponding to a reduction of the polar pitch of the machine) determines an increase in the induced counter-electromotive force (i.e., of the resistant torque acting on the wheel 10) given the same size and velocity of rotation of the rotor 24 (and hence of intensity of the current induced on each single phase).

The invention claimed is:

1. A braking system for an aircraft (2) provided with an undercarriage (7) including a wheel (10), comprising:
   an axial-flux reversible electrical machine (20) associated with at least one wheel of the undercarriage and set in rotation by the rotation of the wheel, the electrical machine having at least one rotor (32a, 32b, 32c) and at least one stator (34a, 34b) with windings (36a, 36b, 36c);
   current-dissipator means (40a, 40b, 40c) to the windings (36a, 36b, 36c) of the axial-flux reversible electrical machine (20) during rotation of the wheel (10) in a landing phase for dissipating in the current-dissipator means (40a, 40b, 40c) the induced currents generated by the electrical machine (20), functioning as a current generator (20), and producing a braking effect that slows down the movement of the wheel (10);
   an epicyclic reducer (21) set between the wheel (10) of the undercarriage and the at least one rotor (32a, 32b, 32c) of said reversible electrical machine (20);
   an accumulation device (46) connectable to the axial-flux reversible electrical machine (20) for storing the electrical charge not dissipated in the current-dissipator means (40a, 40b, 40c); and
   control means (50) for governing the transfer of electrical charge from the accumulation device (46) to the axial-flux reversible electrical machine (20) for supplying further power for braking;
   the control means (50) also governing the transfer of electrical charge from the accumulation device (46) when the velocity of rotation of the wheel drops below a first threshold value;
   the control means (50) further governing the transfer of electrical energy from an electrical network (55) of the aircraft to the reversible electrical machine when the velocity of rotation of the wheel drops below a second threshold value lower than the first threshold value;
   the epicyclic reducer (21) providing a transmission ratio T in such a way that the at least one rotor (32a, 32b, 32c) will turn at a velocity Tω with respect to the velocity of rotation ω of the wheel (10).

2. The system according to claim 1, wherein the epicyclic reducer (21) comprises:
   a ring gear (22) angularly fixed with respect to the wheel (10);
   a plurality of planetary gears or satellites (24), which mesh on the ring gear (22); and
   a sun gear (25), which meshes with the planetary gears or satellites (24) and is angularly fixed with respect to the at least one rotor of the reversible electrical machine (20).

3. The system according to claim 2, wherein the at least one stator (34a, 34b) faces the at least one rotor and is angularly fixed with respect to a portion of the undercarriage (5, 7).

4. The system according to claim 3, wherein the stator (34) of the axial-flux reversible electrical machine (20) is fixed with respect to a frame (8) of the undercarriage.

5. The system according to claim 1, wherein the current-dissipator means (40a, 40b, 40c) comprise resistor means.

6. The system according to claim 5, wherein the resistor means have a resistance R(f) that varies according to a command (43) in order to modulate the braking action.

7. The system according to claim 1, wherein the control means (50), following upon completion of the braking operations, are configured for issuing a command for a flow of current from the on-board electrical network (55) to the electrical machine (20) with a direction such as to obtain rotation of the reversible electrical machine and generation of a torque that brings about displacement of the aircraft (2) on a runway.

8. The system according to claim 1, wherein the axial-flux reversible electrical machine (20) is of a three-phase type and comprises a first winding (36a), a second winding (36b) and a third winding (36c), which have first terminals connected to one another and second terminals connected, respectively, to a first electric line (37a), a second electric line (37b), and a third electric line (37c) that can be connected (38a, 38b, 38c) to the current-dissipator means (40a, 40b, 40c), respectively.

9. The system according to claim 1, wherein the axial-flux reversible electrical machine (20) is of a six-phase type.

* * * * *